(12) United States Patent
Bonald et al.

(10) Patent No.: US 8,797,894 B2
(45) Date of Patent: Aug. 5, 2014

(54) TECHNIQUE FOR COMMUNICATION BETWEEN A PLURALITY OF NODES

(75) Inventors: Thomas Bonald, Voisins le Bretonneux (FR); Sara Oueslati, Chatillon (FR); James Roberts, Voisins le Bretonneux (FR)

(73) Assignee: Orange, Paris (FR)

( * ) Notice: Subject to any disclaimer, the term of this patent is extended or adjusted under 35 U.S.C. 154(b) by 338 days.

(21) Appl. No.: 13/003,944

(22) PCT Filed: Jul. 3, 2009

(86) PCT No.: PCT/FR2009/051301
§ 371 (c)(1),
(2), (4) Date: Jan. 13, 2011

(87) PCT Pub. No.: WO2010/010266
PCT Pub. Date: Jan. 28, 2010

(65) Prior Publication Data
US 2011/0122791 A1    May 26, 2011

(30) Foreign Application Priority Data
Jul. 23, 2008    (FR) ........................................ 0855018

(51) Int. Cl.
*H04L 12/42* (2006.01)

(52) U.S. Cl.
USPC ........ 370/252; 370/229; 370/395.4; 370/237; 709/220; 709/226

(58) Field of Classification Search
USPC .................. 370/229, 447, 462, 458, 468, 477, 370/252–253, 395.4; 455/414.3; 709/220, 709/226
See application file for complete search history.

(56) References Cited

U.S. PATENT DOCUMENTS

| 2003/0165146 | A1 |  | 9/2003 | Sultan et al. |
| 2005/0096089 | A1 | * | 5/2005 | Ishii et al. ........................ 455/561 |
| 2005/0188089 | A1 | * | 8/2005 | Lichtenstein et al. ......... 709/226 |
| 2006/0056291 | A1 | * | 3/2006 | Baker et al. ..................... 370/229 |
| 2006/0222007 | A1 |  | 10/2006 | Karakawa et al. |
| 2007/0044102 | A1 | * | 2/2007 | Casotto ........................... 718/103 |
| 2007/0264986 | A1 | * | 11/2007 | Warrillow et al. .......... 455/414.3 |
| 2009/0003202 | A1 | * | 1/2009 | Polk et al. ....................... 370/229 |
| 2013/0010805 | A1 | * | 1/2013 | Boroditsky et al. ............ 370/458 |

FOREIGN PATENT DOCUMENTS

EP    1 814 265 A1    8/2007

* cited by examiner

*Primary Examiner* — Charles C Jiang
*Assistant Examiner* — Mohamed Kamara
(74) *Attorney, Agent, or Firm* — Drinker Biddle & Reath LLP

(57) ABSTRACT

A method is provided for communication between a plurality nodes organized as a ring provided with transmission resources at least one of which is a control resource dedicated to transmitting control information and associated with at least one transmission resource, said method comprising the following step executed by a node of the ring: a step of receiving information relating to a reservation of a transmission window of the transmission resource received over the associated control resource. The method further comprises, if the transmission window is reserved by another node of the ring, steps of: comparing the respective volumes of reservations of resources of the ring made by the node in question and by the other node during a reference period; and pre-empting said reservation of the transmission window as a function of the result of the comparison step.

8 Claims, 2 Drawing Sheets

TECHNIQUE FOR COMMUNICATION BETWEEN A PLURALITY OF NODES

CROSS-REFERENCE TO RELATED APPLICATIONS

This application is the U.S. national phase of the International Patent Application No. PCT/FR2009/051301 filed Jul. 3, 2009, which claims the benefit of French Application No. 08 55018 filed Jul. 23, 2008, the entire content of which is incorporated herein by reference.

FIELD OF THE INVENTION

The invention relates to a technique for communication between a plurality of nodes organized as a ring.

BACKGROUND

The present context is that of a communications network in which the nodes are organized as a ring, enabling them to communicate with each other. To be more precise, the nodes of the communications network are connected by two unidirectional rings, one for each rotation direction. This topology is particularly suitable for metropolitan area networks (MAN) because it is fault-resistant: in the event of a fault breaking both rings at the same point, a new logical ring can be formed by joining together the two physical rings upstream and downstream of the break.

The following disclosure relates to a mechanism for controlling access to one of the two rings or to the logical ring formed after a fault. A ring comprises one or more ring resources. In a time-division ring, a reference period is divided into time intervals of fixed duration, a time interval being used to transmit one or more packets. As used below the expression "transmission resource" refers to a subset of one of the resources of the ring accessible during a given time interval, also known as a transmission window. The ring is used to route various data streams, some of which have time constraints, for example conversation and audiovisual streams.

Numerous mechanisms have been proposed for controlling access to the transmission resource. To be effective, they must enable spatial re-use, i.e. the successive use of the same transmission resource for communications involving different parts of the ring. To achieve this, the transmission resource must be released by the destination node of the data transmitted during the transmission window as soon as the data is received.

Moreover, nodes must be prevented from monopolizing the transmission resource, for example because of a better position on the ring. With the nodes numbered from 1 to N in the rotation direction of the ring, if node 1 transmits a large volume of data to node N, a node situated between these two nodes may be refused access to the transmission resource, for example. In the absence of any control, node 1 can thus access the resource easily and potentially monopolize it. It is therefore necessary to regulate access of the nodes to the transmission resources. This access control must be fast to prevent streams with time constraints having to wait.

The Resilient Packet Ring mechanism defined by IEEE standard 802.17 consists in not blocking access to the transmission resource providing the sizes of the respective queues of packets waiting to be transmitted from the nodes are below a predetermined threshold. Such a mechanism is described in the article "IEEE 802.17 Resilient Packet Ring Tutorial" by F. Davik et al. published in IEEE Communications Magazine, March 2004. If a given node detects congestion, it reports it to the upstream nodes on the ring, i.e. the nodes that might insert traffic into the ring. Reception of this congestion information by one of the nodes of the ring causes it to reduce its own consumption of transmission resources. The system is thus reactive, i.e. action is taken in response to detecting congestion.

Choosing the predetermined threshold or congestion-detection threshold is not easy. Too low a threshold prevents full use of resources, some nodes reducing their own consumption of transmission resources when there is no real congestion. In contrast, too high a threshold increases the waiting times for some nodes, a node reacting only when the congestion-detection threshold is reached. Because of the random nature of traffic, there is no optimum threshold.

The prior art technique therefore fails to respond in a satisfactory manner to the problem of access to transmission resources in a time-division ring. With a threshold sufficiently high to enable effective use of the bandwidth, the mechanism can cause localized famines for some nodes, which may disrupt applications sensitive to waiting time, such as voice or video applications.

Patent application US2007/029744 proposes a mechanism for use by a node of a time-division ring in order to reserve a transmission window. In one implementation, the node reserves a transmission window as soon as its queue contains packets waiting for transmission. Alternatively, the node reserves the transmission window only if it detects congestion. The implementation described is unsatisfactory in that, once again, a node is able to monopolize a portion of the resources of the ring by reserving transmission resources in a quasi-continuous manner. It has the further drawback of using the reservation mechanism only when congestion is detected. The problem of defining the thresholds described above arises again.

SUMMARY

One object of the invention is to remedy the insufficiencies/drawbacks of the prior art and/or to improve on the prior art.

The invention provides a method of communication between a plurality of nodes organized as a ring provided with transmission resources, at least one of which is a control resource dedicated to transmitting control information and associated with at least one transmission resource, said method including the following step executed by a node of the ring:

a step of receiving information relating to a reservation of a transmission window of the transmission resource received over the associated control resource;

the method being characterized in that, if the transmission window is reserved by another node of the ring, it further includes:

a step of comparing the respective volumes of reservations of resources of the ring made by the node in question and by the other node during a reference period; and a step of pre-empting said reservation of the transmission window as a function of the result of the comparison step.

Note that the invention is applicable to any type of ring, whether the transmission window duration is fixed or variable.

Thus the method of the invention makes it possible to improve access to resources independently of detection of congestion and therefore makes it possible to prevent congestion arising. The proposed reservation mechanism, possibly including pre-emption of a reservation effected by another node, makes it possible to guarantee a better distribution of resources between the nodes of the ring. It further makes it possible to guarantee a minimum data rate to each of the nodes of the ring. This transmission resources transmission window reservation mechanism ensures that a minimum fraction of the resources is available for each node, which guarantees short access delays to the transmission resource so long as the traffic of the nodes of the ring does not exceed the total capacity of the ring.

Moreover, the use of resources is more efficient compared to other, preventive methods, i.e. methods that seek to prevent congestion occurring. One example of a preventive method, the mechanism described in the paper "Metaring: A Full-Duplex Ring with Fairness and Spatial Reuse", by I. Cidon et al., published in the Proceedings of the IEEE Conference INFOCOM, June 1990, authorizes for each node a quota of packets that may be transmitted in each cycle, the cycle being determined by the time for a control packet to travel round the ring. Choosing too small a quota prevents full use of resources, nodes being unable to transmit further after using up their quota, even if transmission resources are available. Choosing too high a quota increases waiting times, a node being able to monopolize the transmission resource so long as its own quota of packets transmitted in a cycle has not been reached. The method claimed here does not have that type of drawback, the nodes pre-empting transmission window reservations by observing reservations effected by other nodes of the ring. Thus this method makes it possible to distribute transmission resources as a function of the current operation of the ring and not as a function of predetermined quotas or thresholds.

A control resource may be associated with one or more transmission resources.

For example, the ring may be optical and the resources of the ring may consist of a plurality of wavelengths. A resource of the ring is divided into one or more transmission windows of fixed duration. The transmission resource consists of a sub-set of a resource of the ring accessible on the occurrence of one of the transmission windows. One of the wavelengths may be dedicated to control resources and the others to transmission resources.

The information relating to a reservation of a transmission window of the transmission resource may be an identifier of the node that made the reservation, for example.

In a synchronous time-division multiplex ring, the transmission windows are of fixed duration. In this situation, the volume of reservations made by a node corresponds to the number of transmission windows reserved. The reference period may be determined on the basis of the passage of a synchronization transmission window.

In an asynchronous time-division multiplex ring, the transmission windows are of variable duration. The volume of reservations made by a node then corresponds to the cumulative duration of the transmission windows reserved. The reference period may be determined on the basis of the passage of a synchronization flag across a transmission window.

In a first implementation, the pre-emption step is effected if the volume of reservations of resources of the ring made by the other node over the reference period is greater by a pre-determined volume than that of the node.

In this first implementation, the nodes of the ring have exactly the same weight. Thus if the volume of reservations made by the other node is less than the volume of reservations effected by the node in question, the node in question does not pre-empt the reservation made by the other node.

In a second implementation, a weight is assigned to each node, and the pre-emption step is effected if the ratio of the respective volumes of reservation of resources of the ring made by the other node and by the node in question over the reference period is greater than the ratio of the respective weights of said nodes.

In this second implementation, the nodes of the ring have different weights. For example, the choice may be made to assign a greater weight to a node that essentially transmits data linked to applications that are sensitive to a transmission delay. Thus, during the comparison step, by taking account of the respective weights of the node in question and of the other node, it is possible to guarantee access to the transmission resources as a function of the assigned weights.

Moreover, the pre-emption step is executed as a function of a result of a step of comparing the volume of reservations of resources of the ring made by the node in question and a volume of packets waiting for transmission by the node in question.

It is not necessary to pre-empt a reservation made by the other node if the node in question has already reserved a volume of transmission windows necessary for the transmission of the waiting packets.

Moreover, if the transmission window is free but reserved by the other node, the method includes:
  a step of seeking an intermediate node situated in the ring between the node in question and said other node and to which at least one packet is to be transmitted;
  if such an intermediate node is found, a step of transmitting at least one packet to the intermediate node in the transmission window.

This makes it possible to improve use of the resources of the ring. The ring organization of the nodes is exploited to enable a node to use a transmission window of a free transmission resource that is reserved for another node to transmit to an intermediate node between the node in question and the other node in the ring structure. The method thus enables spatial re-use of the transmission window of a free transmission resource reserved by the other node.

This opportunistic transmission ensures full utilization of resources. By scheduling the transmission of packets in the transmission resources reserved for it or that it uses opportunistically, a node minimizes the access time for applications sensitive to the waiting time, such as conversation or audio-visual applications.

The invention further provides a node adapted to be connected to other nodes organized as a ring having transmission resources at least one of which is a control resource dedicated to transmitting control information and associated with at least one transmission resource, said node including:
  means for receiving information relating to a reservation of a transmission window of the transmission resource received over the associated control resource; and
  means for determining the transmission resource reservation status; and
  the node being characterized in that it further includes:
  comparison means for comparing volumes of reservations of resources of the ring made by two nodes during a reference period; and
  pre-emption means for pre-empting a reservation of a transmission window made by another node as a function of the result supplied by the comparison means.

The invention further provides a communications system comprising a plurality of nodes as described above.

The invention further provides computer program including instructions for execution by a node of the above method of communication between a plurality of nodes organized as a ring when the program is executed by a processor.

BRIEF DESCRIPTION OF THE DRAWINGS

The invention can be better understood with the aid of the following description of a method of one particular implementation of the invention with reference to the appended drawings, in which.

DETAILED DESCRIPTION

Figure 1:
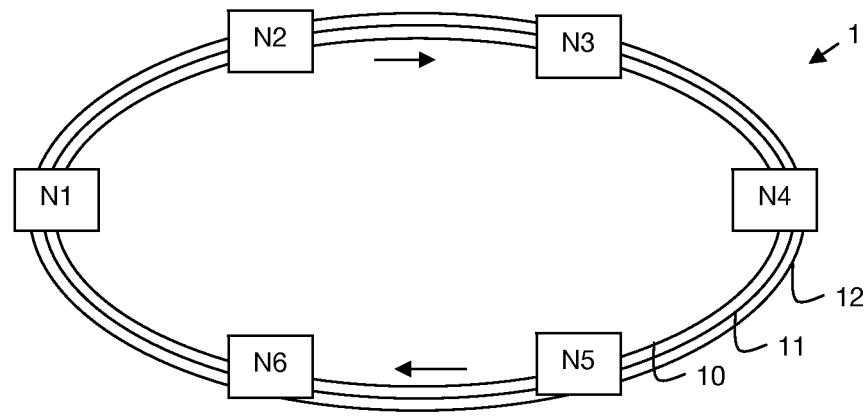
FIG. 1 represents a communications network in which nodes are organized in a ring.

FIG. 1 shows a plurality of nodes N1 to N6 organized as a ring 1. Any node N1 to N6 of the ring 1 is able to communicate with any other node of the ring. The ring 1 is provided with M physical resources, three of which 10, 11, 12 are represented in FIG. 1. These are different wavelengths on an optical link, for example. Each physical resource is divided into a plurality of time intervals or transmission windows. A transmission resource consists of parts of a physical resource of the ring accessible during the transmission window, for example time intervals 1 to L of fixed duration. In some implementations, L may take a value equal to 1. Thus a physical resource "i" is divided into L transmission resources P(i,j) where i varies from 1 to M and j varies from 1 to L. A single rotation direction is represented by arrows in FIG. 1, to avoid over-complicating the figure. A second ring corresponding to the opposite rotation direction may be provided to obtain a fault-resistant network configuration. One of the physical resources is more particularly dedicated to transmitting control information in the ring and thus supports particular transmission resources referred to below as control resources C(j), where j varies from 1 to L. A control resource C(j) is associated with one or more transmission resources P(i,j), thus corresponding to the same transmission window j. Thus a control resource defined by a given transmission window transmits to nodes of the ring control information relating to the transmission resources defined by the same given window. The control information includes in particular for each transmission resource P(i,j) with which the control resource C(j) is associated, and thus for a given transmission window:

information relating to the status of the transmission window, "free" or "busy";

if the status is "busy", an identifier of the destination node of the data contained in the transmission window;

reservation status information, "reserved" or "unreserved", indicating if a node has requested reservation of the transmission window; and if the reservation status is "reserved", an identifier of a node of the ring that requested the reservation.

It should be emphasized at this point the identifier of the destination node of the data may equally take a value indicating that a set of nodes of the ring constitutes the destination of the data when using a broadcast mode.

Note that if a node modifies the reservation status in the control information it is then a question of a reservation for the next occurrence of the transmission window and not directly for the given transmission window.

For example, the data transmitted on the control resource may be received ahead of time compared to the transmission resources in order to enable a node to receive the control information, to interpret it, and to decide on the processing to be effected on the upcoming transmission resources, for example a time-shift by a transmission window period.

Figure 3:
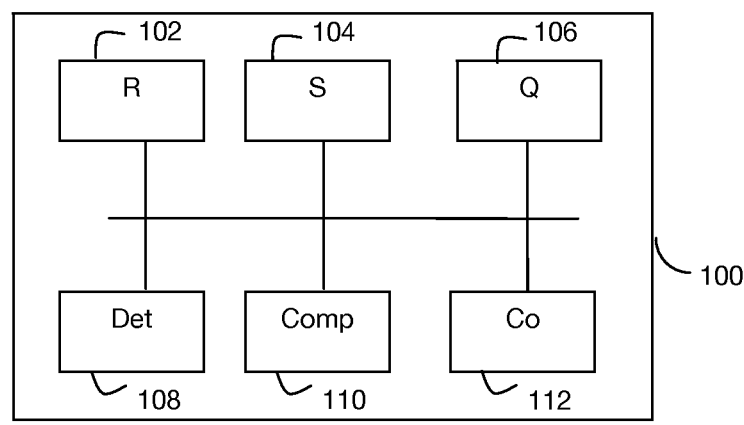
FIG. 3 is a functional block diagram of a node of one particular implementation of the invention.

Each node N1 to N6 of the ring 1 includes means 102 for reading data received on the ring 1 by means of the transmission resources, denoted "S" in FIG. 3, and means 104 for sending data by means of said resources, denoted "R" in FIG. 3. The data sending means 104 are adapted to transmit data stored in one or more queues 106, denoted "Q" in FIG. 3.

The method of communication between a plurality of nodes is described below with reference to FIG. 2. The following description applies to the node N1.

Below, the transmission windows are of fixed duration.

The method begins with a step E0 for processing a transmission window.

In a step E1 ("Rec Info" in FIG. 2), the node N1 receives on the control resource control information relating to the occupation status and the reservation status of the same transmission window on each of the transmission resources. Where applicable, it also receives an identifier of the destination node of the data and an identifier of the node that reserved the corresponding transmission resource.

The following description refers to a given transmission resource, these steps being repeated for the transmission resources with which the control resource in question is associated.

In a step E2 of testing the destination node ("?Dest=S" in FIG. 2), the node N1 verifies whether the occupancy status of the given transmission resource is "busy" and, if so, the destination of the data that will be received on it.

If the occupancy status is "busy" and the node N1 is the destination of the data, in a step E3 of modifying the occupancy status of the transmission resource ("Mod F" in FIG. 2), the node changes that status from "busy" to "free". It also activates the data reading means 102 to receive data on the transmission resource. Note that if the node N1 is not the only destination of the data (I.e. in broadcast mode), the occupancy status of the transmission resource is not modified, as there are other nodes that are destinations for the data.

No processing is effected if the occupancy status is "free" or the occupancy status is "busy" but the destination node is not the node N1.

In a synchronization step E4 ("?sync" in FIG. 2), the node N1 verifies whether this transmission window contains synchronization information. For example, this may be a question of detecting a reference or synchronization window, such as that corresponding to a time interval numbered 0. If such a detection is made, then in an initialization step E5 ("Init $R_x$" in FIG. 2), for each of the nodes of the ring, including itself, the node N1 initializes a count that represents the volume of reservations effected, denoted $R_k$ for the node $N_k$. For example the number of transmission windows reserved is counted. This detection of synchronization information defines the start of a reference period and consequently the end of the preceding reference period.

The next step is a test step E6 ("?N>0" in FIG. 2) in which the node N1 verifies whether packets are waiting for transmission on the ring, stored in the queue 106. If there is no packet waiting for transmission, the next step is a step E17 described below.

Figure 2:
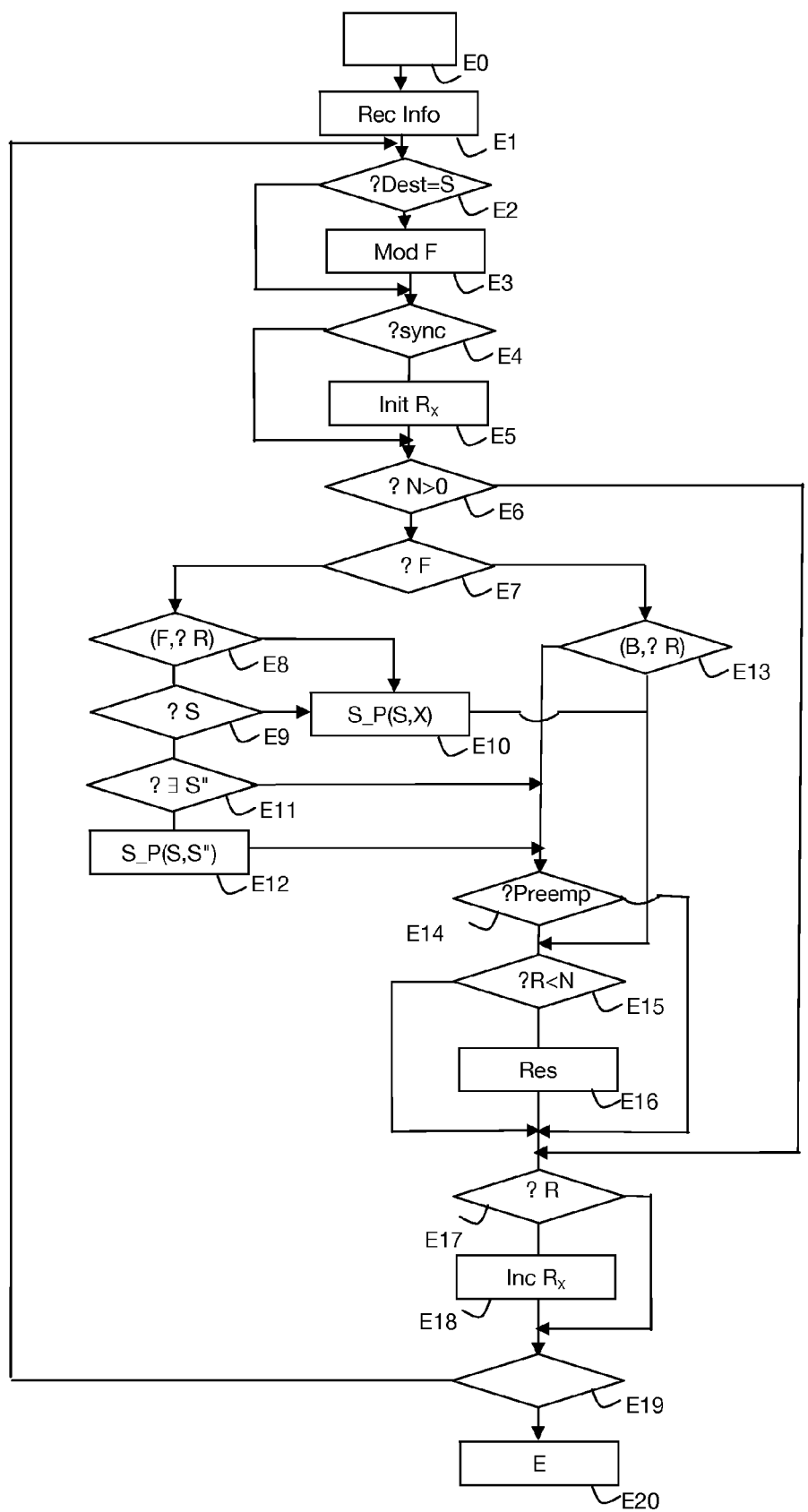
FIG. 2 represents the steps of communication between nodes by a method of one particular implementation of the invention.

If there are packets waiting for transmission on the ring, the next step is an occupancy status test step E7 ("?F" in FIG. 2).

If the occupancy status is "free", the next step is a reservation status test step E8 ("(F,?R)" in FIG. 2).

If the reservation state is "unreserved", in a step E10 ("S_P (S,X)" in FIG. 2), the node N1 modifies the occupancy status of the given transmission resource from "free" to "busy" and selects data waiting for transmission in the queue 106. It activates the transmission means 104 in order for the selected data to be transmitted in the transmission resource. It decrements the number of packets waiting for transmission as a function of the volume of the selected data. The next step is a step E15 described below.

If the reservation state is "reserved", in a reservation verification step E9 ("?S" FIG. 2), using the control information, the node N1 verifies whether it made the reservation itself during the preceding passage of the transmission window. If so, the next step is the step E10 described above.

If it is not the node that made the reservation, in a search step E11 ("?∃S"" in FIG. 2), the node N1 determines whether, depending on the rotation direction of the ring, there is an intermediate node on the ring between itself and the node Nr that made the reservation and for which there is at least one packet to be transmitted.

If there is no such intermediate node, the next step is the step E14 described below.

If there is such an intermediate node, in a step E12 ("S_P (S,S")" in FIG. 2), the node N1 modifies the occupancy status of the given transmission resource from "free" to "busy" and extracts the corresponding data from the queue 106. It activates the sending means 104 in order for the extracted data to be transmitted on the transmission resource. It decrements the number of packets waiting for transmission as a function of the volume of data extracted. Thus the method enables better use of the resources of the ring by enabling spatial re-use of the transmission window of a free transmission resource reserved for the other node. The next step is then the step E14.

Returning to the step E7, if the occupancy status is "busy", the next step is a reservation status test step E13 ("(B,?R)" in FIG. 2).

If the reservation status is "unreserved", the next step is the step E15 described below.

If the reservation status is "reserved", the next step is the step E14.

The step E14 ("?Preemp" in FIG. 2), aims to determine whether it is possible to pre-empt the transmission resource reservation made by the node Nr. To this end, the node N1 compares the volumes of ring resource reservation made by the node N1 and the node Nr, i.e. $R_1$ and $R_r$.

In a first implementation, the nodes are not distinguished from each other. The comparison may then consist in verifying whether the volume of ring resource reservations made by the node Nr is greater by at least a predetermined volume than the volume of ring resource reservations made by the node N1. If so, it is considered that the reservation made by the node Nr may be pre-empted and the next step is the step E15 described below. If not, i.e. if the reservation made by the node Nr is not susceptible to being pre-empted, the next step is the step E17.

In a second implementation, the aim is to take account of specific features of the nodes. For example, some nodes transmit data streams relating to applications sensitive to the waiting time. In this situation, different weights $w_1$ are assigned to the various nodes during a configuration step not represented in FIG. 2. The comparison may then consist in verifying whether the ratio of the respective volumes of ring resource reservations made by the node Nr and by the node N1 over the reference period is greater than the ratio of their respective weights, that is to say $R_r/R_1 > w_r/w_1$. If so, it is considered that the reservation made by the node Nr may be pre-empted and the next step is the step E15, described below. If not, i.e. if the reservation effected by the node Nr is not susceptible to being pre-empted, the next step is the step E17.

In the step E15, ("?R<N" in FIG. 2), the node N1 verifies whether the volume resource reservation that it has made is less than a volume of packets waiting for transmission. If so and the reservation effected by the node Nr may be pre-empted, in a reservation step E16 ("Res" in FIG. 2), the node N1 modifies in the control information the identifier of the node that made the reservation by inserting its own identity therein. The next step is then the step E17. It should be emphasized here that it is not a question of pre-empting the resource itself but of pre-empting a reservation for a subsequent occurrence of the transmission window, following a complete circuit of the ring 1. The nodes pre-empting transmission window reservations as a function of observations of the reservations effected by the other nodes of the ring, the method makes it possible to distribute the transmission resources as a function of the current operation of the ring and to adapt dynamically as a function of the respective traffic variations of the nodes of the ring. It thus has the advantage over the reactive and preventive prior art mechanisms of being dynamic.

If not, i.e. if the volume of resource reservations made is sufficient to transmit the packets waiting for transmission, it is not necessary to pre-empt a reservation effected by another node. The next step is the step E17.

During the test step E17 ("?R" in FIG. 2), the node N1 verifies whether the reservation status is "reserved". If so, in a step E18 ("Inc $R_x$" in FIG. 2), the node N1 modifies the count $R_r$ representing the volume of resource reservations made associated with the node Nr that made the reservation.

During a step E19, the node N1 verifies whether all the control information received in the step E1 has been processed. If not, the next step is the step E2.

When all the control information received in the step E1 has been processed, by executing the steps E2 to E19 for each transmission resource with which the control resource is associated, during a step E20, the node N1 transmits on the control resource the new control information obtained by executing the steps of the method.

Instead of the above implementations, it is also possible to omit the step E15 and thus to reserve the transmission window as soon as it is decided that a reservation made by another node may be pre-empted. This variant is an improvement over the above-mentioned known mechanisms.

In another variant of these implementations, it is also possible to omit the step E11. If so use of the resources of the ring is not completely optimized, but the method as described also improves on the above-mentioned known mechanisms.

In the implementation described here, the count $R_k$ represents the volume of reservations made by the node $N_k$ for a given transmission resource. This implementation is particularly suitable if the resources of the ring are divided between groups of nodes, for example a first group of even-number nodes and a second group of odd-number nodes. It is also possible without particular difficulty to adapt the method by using a count representing the volume of reservations made by the node $N_k$ for all of the transmission resources with which a control resource is associated or for all the resources of the ring.

The method has been described for implementations in which the transmission windows are of fixed duration. It is also possible to implement it for a ring in which data is transmitted asynchronously. In this other implementation, the transmission windows may be of variable duration. In the step E4 of the method, the node N1 verifies whether this transmission window contains synchronization information, for example a particular flag. The count $R_k$ representing the volume of reservations made by the node Nk now corresponds to the cumulative duration of the reserved transmission windows.

A node 100 for use in a ring is described below with reference to FIG. 3.

Such a node comprises:
- means 102 for reading data on the ring;
- means 104 for sending data on the ring;
- a queue or queues 106 of data waiting for transmission;
- a module 108 ("Det" in FIG. 3) for determining transmission resource status;
- a comparison module 110 ("Comp" in FIG. 3); and
- a control module 112 ("Co" in FIG. 3).

The control module 112 is in particular adapted:
- to control the means and modules of the node, and more precisely;
- to receive data received over the resources of the ring from the data reading means 102, this data containing control information received over a control resource;
- to determine the start of a reference period;
- to transfer the control information to the module 108 for determining status and to receive in response a reservation status of a transmission resource and an identifier of the node that made the reservation;
- to select at least one packet to be transmitted in the queue or queues 106 and to transfer it or them to the sending means 104;
- to control the comparison module 110 for two nodes and to receive in return the result of comparing the volumes of reservations effected by the two nodes;
- to pre-empt a reservation of a transmission window made by another node as a function of the result received from the module 110; and
- to transfer the control information to the transmission means 104.

The data reading means 102 receive data over the resources of the ring and transfer received data to the control module 112.

The data sending means 104 receive data from the control module 112 and send that data over the resources of the ring.

The status determination module 108 receives control information from the control module 112 for determining a reservation status of one or more transmission resources and transfers that reservation status to the control module 112.

The comparison module 110 compares volumes of reservations of resources of the ring made by two nodes during a reference period and transfers a comparison result to the control module 112.

In a variant, the comparison module 110 compares a volume of reservations made by a node and a volume of packets stored in the queue 106.

The module 108 is optionally determines an occupancy status of a transmission resource from the control information.

In another variant, the control module 112 determines an intermediate node situated between a node that has made a reservation and the node to which is addressed at least one packet that is stored in the queue or queues 106 and transfers the packet or packets to be transmitted to the sending means 104.

The modules 106-112 of the node execute the above method of communication between a plurality of nodes. They are preferably software modules comprising software instructions for execution by a node of the steps of the above method. Thus the invention also provides:
- a computer program including instructions for execution by a node of the above method of communication between a plurality of nodes organized as a ring when the program is executed by a processor; and
- a storage medium readable by a node and storing the above computer program.

The software modules may be stored in or transmitted by a data medium, which may be a hardware storage medium, for example a CD-ROM, a magnetic diskette or a hard disk, a transmission medium such as an electrical, optical or radio signal or a telecommunications network.

The invention further provides a communications system comprising a plurality of nodes organized as a ring as described above.

The invention claimed is:

1. A method of communication between a plurality of nodes organized as a ring provided with transmission resources, wherein at least one of the transmission resources is a control resource dedicated to transmitting control information and associated with at least one transmission resource, said method comprising the following step executed by a first node of the ring:
   receiving information relating to a reservation of a subsequent transmission window of the transmission resource received over the associated control resource;
   wherein, if the subsequent transmission window is reserved by a second node of the ring, the method further comprises steps of:
   comparing the respective volumes of reservations of resources of the ring made by the first node and by the second node for at least one previous transmission window during a reference period; and
   pre-empting said reservation of the subsequent transmission window as a function of the result of the comparison step.

2. The method according to claim 1, wherein the pre-emption step is effected if the volume of reservations of resources of the ring made by the second node over the reference period is greater by a predetermined volume than that of the first node.

3. The method according to claim 1, further comprising assigning a weight to each node and effecting the pre-emption step if a ratio of the respective volumes of reservation of resources of the ring made by the second node and by the first node over the reference period is greater than a ratio of the respective weights of said nodes.

4. The method according to claim 1, wherein the pre-emption step for said subsequent transmission window is executed as a function of a result of a step of comparing the volume of reservations of resources of the ring made by the first node for said at least one previous transmission window and a volume of packets waiting for transmission by the first node.

5. The method according to claim 1, further comprising, if the subsequent transmission window is free but reserved by the other node, steps of:
   seeking an intermediate node situated in the ring between the first node and the second node and to which at least one packet is to be transmitted; and
   if such an intermediate node is found, transmitting at least one packet to the intermediate node in the subsequent transmission window.

6. A first node that is connected to other nodes organized as a ring, having transmission resources, wherein at least one of the transmission resources is a control resource dedicated to transmitting control information and associated with at least one transmission resource, said first node comprising means for:

receiving information relating to a reservation of a subsequent transmission window of the transmission resource received over the associated control resource; and determining the transmission resource reservation status;

the first node further comprising means for:

if the subsequent transmission window is reserved by a second node of the ring, comparing volumes of reservations of resources of the ring made by the first node and by the second node for at least one previous transmission window during a reference period; and pre-empting a reservation of the subsequent transmission window made by the second node as a function of the result supplied by the comparison means.

7. A communication system comprising a plurality of nodes, wherein each node of the plurality is connected to other nodes of the plurality, wherein the plurality of nodes are organized as a ring, wherein the communication system has transmission resources, wherein at least one of the transmission resources is a control resource dedicated to transmitting control information and associated with at least one transmission resource, wherein each node comprises means for:

receiving information relating to a reservation of a subsequent transmission window of the transmission resource received over the associated control resource;

determining the transmission resource reservation status;

if the subsequent transmission window is reserved by a second node of the ring, comparing volumes of reservations of resources of the ring made by the second node and by the second node for at least one previous transmission window during a reference period; and pre-empting a reservation of the subsequent transmission window made by the second node as a function of the result supplied by the comparing means.

8. A non-transitory computer program product comprising instructions for carrying out a method of communication among a plurality of nodes organized as a ring provided with transmission resources, wherein at least one of the transmission resources is a control resource dedicated to transmitting control information and associated with at least one transmission resource, wherein the instructions are executable by a first node of the ring, wherein the instructions comprise instructions for:

receiving information relating to a reservation of a subsequent transmission window of the transmission resource received over the associated control resource;

if the subsequent transmission window is reserved by a second node of the ring, comparing the respective volumes of reservations of resources of the ring made by the first node and by the second node for at least one previous transmission window during a reference period; and pre-empting said reservation of the subsequent transmission window as a function of the result of the comparison step.

* * * * *